H. WILD.
PROCESS OF MANUFACTURING VALVES.
APPLICATION FILED SEPT. 18, 1919.

1,361,214. Patented Dec. 7, 1920.

Inventor
HENRY WILD.
By Ralzemond A. Parker
Attorney

UNITED STATES PATENT OFFICE.

HENRY WILD, OF DETROIT, MICHIGAN.

PROCESS OF MANUFACTURING VALVES.

1,361,214.  Specification of Letters Patent.  Patented Dec. 7, 1920.

Application filed September 18, 1919. Serial No. 324,304.

*To all whom it may concern:*

Be it known that I, HENRY WILD, a citizen of the Republic of Switzerland, residing at Detroit, county of Wayne, State of Michigan, have invented a certain new and useful Improvement in Processes of Manufacturing Valves, and declare the following to be a full, clear, and exact description of the same, such as will enable others skilled in the art to which it pertains to make and use the same, reference being had to the accompanying drawings, which form a part of this specification.

This invention relates to valves and the process of valve manufacturing and particularly to the manufacture of that type of valve commonly known as a puppet valve, being a drop or disk valve.

The object is to produce a valve of high strength quality at a substantially lower cost than is possible with the methods of manufacture in use today.

Valves of the type here illustrated and made the subject of this application are ordinarily formed of two parts, a head or disk of metal with a stem on one side coaxial with the disk. The valve may of course be of one piece, but as that is an expensive method of manufacture, it is not the usual practice.

The usual method of manufacture is to use a carbon steel stem, butt-welding the same to a high percentage nickel steel head. The head is ordinarily provided with a short stem to make a butt weld. This makes a high-grade valve but high percentage nickel steel is expensive and the process is therefore a costly one. Carbon steel, on the other hand does not prove entirely satisfactory for the manufacture of valve heads in that the high temperatures to which they are subjected affect injuriously the strength of the steel.

Cast iron makes a good valve head and forms an excellent seat, perhaps better than any of the steels, and is quite widely used for the manufacture of the cheaper grade of drop valves, but under the present methods of manufacture a serious difficulty has attended its use in that the method of attaching the head to the stem has proven unsatisfactory. Various methods have been used, but so far as known to applicant, they are all subject to the objection that constant use tends to weaken the joint between the stem and the head and the life of the valve is therefore of short duration.

Figure 1:
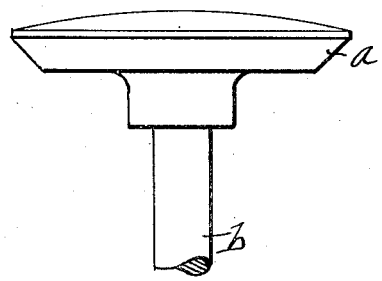
Figure 1 is an elevation of a finished valve.
Figure 5:
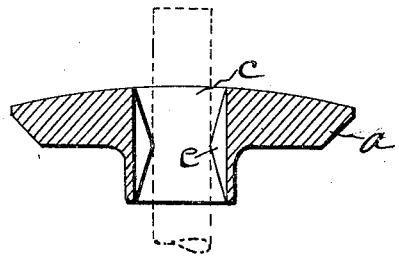
Fig. 5 is a cross-section taken on line 5—5 of Fig. 6.
Figure 2:
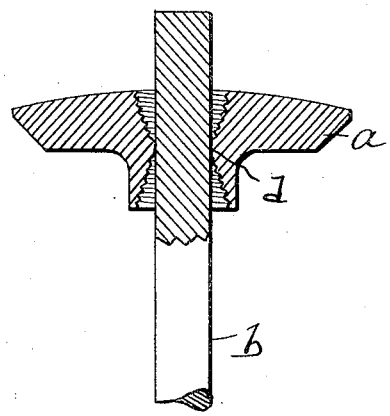
Fig. 2 is a cross-section showing a valve stem passed through the opening in the disk.
Figure 4:
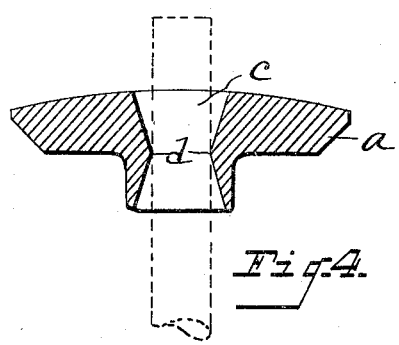
Fig. 4 is a cross-section showing a smooth interior passageway through a valve disk.
Figure 3:
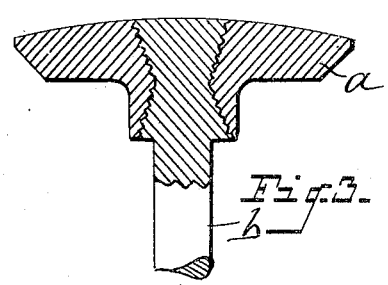
Fig. 3 is a cross-section showing a valve stem fused in place.

Applicant provides a cast iron head $a$ of any conventional design. It is immaterial whether the seat is a plain surface perpendicular to the valve axis or whether it is a truncated conical surface. Axially through this disk is a passageway $c$ tapered inward from each end of said passageway. The shortest diameter of this passageway is at approximately the middle point thereof as indicated at $d$ and which diameter is just sufficient to permit easy passing of a valve stem through, as shown in Fig. 2. The valve is then placed in an electric welding machine and the stem is welded in position. The preferred method of manufacture is to roughen, or better still, thread the tapered passageway so that when the stem is fused in position the metal of the stem will flow into and fill the depressions or grooves in the tapered passageway and the stem will be held firmly in place, as shown in Fig. 3. Fusing of the stem in the tapered passageway will prevent any longitudinal movement of such stem.

Figure 6:
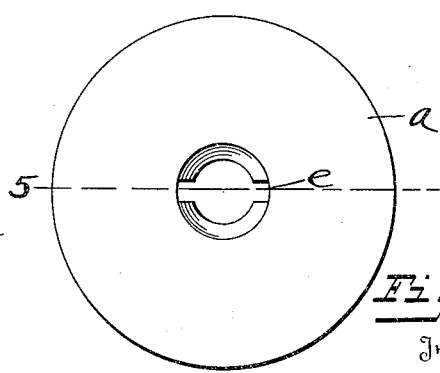
Fig. 6 is a plan view of a valve disk showing a longitudinally grooved axial passageway therethrough.

The opposed tapered ends of the stem might be threaded, one with a right-hand thread and the other with a left-hand thread which would prevent a turning movement on the stem about its longitudinal axis and as a further security against such movement the passageway might be longitudinally grooved as shown at $e$ in Figs. 6 and 7.

It is thought that this method of fastening the stem in the disk will obviate the objections now present in valves where cast iron disks are used with a steel stem. The advantage of the greater strength of cast iron under the high temperatures will be secured for a valve seat and an inexpensive, but thoroughly satisfactory valve, considerably cheaper than valves of like quality now in use, will be the result.

Having thus described my invention, what I claim is:

1. The process of manufacturing a valve by forming an axial passageway through a cast iron disk tapered from each entrance inward so that the shortest diameter of the passageway is at substantially the middle point thereof, roughening such passageway, passing a valve stem therethrough, fusing such disk and stem together.

2. The process of manufacturing a valve by forming an axial passageway through a metal disk tapered from each end inward, threading such passageway, passing a valve stem therethrough and fusing such disk and stem together.

3. The process of manufacturing a valve by forming an aperture through a metal disk, tapering such aperture from each end inward so that the shortest diameter is at substantially the middle point thereof, threading such aperture in opposite directions on oppositely tapered ends, passing a valve stem therethrough, fusing the same with the disk to form a homogeneous mass.

4. The process of manufacturing a valve by forming a passageway tapered from each extremity inward through a metal head providing grooves longitudinally of such passageway, roughening said passageway, passing a valve stem therethrough and welding the same in place.

5. The process of manufacturing a valve by forming a passageway tapered from each end inward through a metal disk, grooving such passageway longitudinally, passing a valve stem therethrough and welding said stem in place.

In testimony whereof, I sign this specification.

HENRY WILD.